3,338,684
PROCESS FOR PREPARING A BORON
HYDRIDE COMPOUND
Marvin M. Fein, Westfield, Daniel Grafstein, Morristown, and Jack Bobinski, Rockaway, N.J., assignors to Thiokol Chemical Corporation, Bristol, Pa., a corporation of Delaware
No Drawing. Filed June 6, 1963, Ser. No. 286,888
6 Claims. (Cl. 23—358)

This invention concerns the preparation of a novel composition of matter, ammonononaborane.

More particularly this invention relates to the preparation of ammonononaborane by the acid catalysed alcoholysis of diammonodecaborane $(NH_3)_2B_{10}H_{12}$. The novel composition has the formula:

$$B_9H_{13}NH_3$$

The ammonononaborane is useful as a reducing agent and as a fuel and fuel additive in solid propellant compositions.

It is well known that the addition of small amounts of certain boron compounds to hydrocarbons employed for propulsive purposes markedly increases both the combustibility and the velocity of flame propogation of the propellant composition. As a result less fuel is required, more energy is released upon ignition and performance is substantially increased. For this reason it is desirable to utilize highly energetic and stable boron compounds as propellant fuels and propellant fuel additives.

It has been found that since the novel ammonononaborane composition of this invention rapidly releases a large amount of energy upon combustion, and is stable to detonation by shock, it is a highly desirable as a propellant fuel or propellant fuel additive.

Unexpectedly it has also been found that ammonononaborane is a potent reducing agent. For example, the composition readily reduces heavy metal salts such as silver to the free metal. This activity as a reducing agent particularly of heavy metal salts, is extremely useful in the preparation and treatment of heavy metal emulsions such as are used in the photographic and reproduction industries.

Thus it is an object of this invention to prepare a highly stable, energetic propellant fuel and propellant additive.

It is a further object of this invention to prepare a stable composition which is an effective reducing agent in inorganic or synthetic organic chemistry.

The novel ammonononaborane is prepared by the acid catalysed alcoholysis of diammonodecaborane. In its preferred embodiment the reaction is carried out by adding an excess of boron trifluoride catalyst to an alcoholic solution of the diammonodecaborane. The vigorously agitated mixture is heated to about reflux temperature until a substantial amount of ammonononaborane is prepared. A convenient means of following the reaction is by the evolution of hydrogen gas from the reaction mixture.

The preparative reaction is relatively rapid and is uncomplicated by side or competing reactions. The yields are good, reaction conditions are mild, and the final product requires little or no purification.

The process is relatively flexible insofar as reaction conditions such as temperatures, pressures, catalysts, solvents and the ratio of reactants is concerned. For example, the success of the reaction is not dependent upon the use of a particular acid catalyst. While boron trifluoride is the preferred catalyst because of the yields obtained with it, other catalysts or mixtures of catalysts can be satisfactorily employed. Examples of additional satisfactory acid catalysts include among others; hydrogen fluoride, hydrogen chloride, hydrogen bromide, and Lewis acids including boron trichloride, the aluminum halides such as the chloride and bromide, the ferric halides such as ferric chloride and ferric bromide, stannic chloride, zinc chloride and the like or combinations therein. Similarly no one particular alcohol need be used as the solvent in the novel process. Hydrogen is evolved during the course of the reaction. Cessation of hydrogen flow indicates the end of the reaction. Satisfactory results have been obtained using various anhydrous alcohols including methanol, ethanol, propanol and isopropanol among others. Because of their low cost and convenient boiling points, ethanol and the propanols are favored as solvents. The reaction is operable between 25 and 100° C. Because of the high reactivity and untoward side-reaction products obtained at the higher temperature ranges, reaction temperatures above 80° C. are to be avoided. On the other hand temperatures below about 25° C. unduly prolong the reaction time and are inconvenient. For these reasons, the narrower reaction temperature of 50 to 75° C. are preferred to optimize yields and reaction times and to minimize competing side reactions. The process of this invention can be operated at pressures ranging from subatmospheric to super-atmospheric. Subatmospheric pressures tend to slow down the reaction velocity and thus offer little advantage. Super-atmospheric pressures while being advantageous in allowing a reduction of reaction temperatures and reaction times, increase safety hazards and capital expenditures and for this reason are to be avoided. Based upon experimental trial, the process of the invention is operated at substantially atmospheric pressures. Neither the order of adding reactants, nor the ratio of the reactants is critical to the success of the reaction. All that is required is that at least a catalytic amount (>0.01 mole percent) of acid catalyst and at least 3 p.b.w. of the alcohol to each part b.w. of the borane is used during the reaction. An excess of catalyst or solvent is not harmful. Where the physical properties of the acid catalyst require it, or where it is convenient, the acid catalyst can be dissolved in an inert solvent or alternatively one or more catalysts can be dissolved in one or more inert solvents. For example, where $BF_3$ is used as catalyst it can be dissolved in an aliphatic or cyclic ether and used as such. The reaction time required for substantial conversion of the diammono-borane starting material to the ammonononaborane product is a variable that is governed by reaction conditions such as temperature and pressure. Ordinarily the reaction time ranges between 3–18 hours or more with 6–12 hours being an average time.

In its composition aspect this invention offers several advantages. For example, the ammonononaborane product is a high energy propellant fuel or fuel additive heretofore unknown to the art. In addition the product is a potent reducing agent particularly in the reduction of heavy metal salts such as silver to the free metal. The compositions are also of interest as intermediates for the preparation of propellant compositions, propellant additives or organic boranes generally.

In its process aspects, the novel process is both surprising and advantageous. For instance, the process uses readily available reactants and as indicated supra, is operable over a wide range of operating conditions. Ancillary advantages are good yields and the substantial absence of contaminants in the product. The alcohols and catalysts are commercially available while the diammonodecaborane starting material can be prepared by contacting bis (acetonitrilo) decaborane with a large excess of hydrazine at moderate temperatures and pressures.

The inventive process is unusual in several respects. For example, while the reaction is classically catagorized as an alcoholysis the starting material loses a mole of ammonia and an atom of boron but adds a hydrogen atom to produce the ammonononaborane. The resultant $B_9$ species contains no BO bonds as is usually the result of borane alcoholysis.

To further illustrate the workings of this invention more thoroughly the following examples are submitted.

*Example 1.—Preparation of ammonononaborane using boron trifluoride as catalyst*

To a suspension of 10 parts by weight of diammonodecaborane in 155 parts of absolute ethyl alcohol is added 10 parts by weight of boron trifluoride etherate. The reaction mixture is placed in a conveniently sized reaction vessel fitted with a means of agitation and heating and a reflux condenser. After the reactants are combined the solution is agitated and brought to reflux. The refluxing is continued for 6 hours, during which time a copious amount of hydrogen is evolved. After the flow of hydrogen ceases the reaction is halted and the vessel cooled to room temperature. The insoluble by-products are filtered off and the product isolated after concentration of the filtrate under vacuum. An almost quantitative yield of a product melting at 164° C. (with decomposition) is obtained. After recrystalization from ether, elemental analysis and infra-red analysis confirm the identity of the ammonononaborane product.

A 5% by weight slurry of the above material is ethanol when added to a 5% by weight solution of silver nitrate in ethanol readily reduced the salt to elemental silver as evidenced by the immediate formation of a black precipitate of colloidal silver.

*Example 2.—Preparation of ammonononaborane using hydrogen chloride as catalyst*

Using the same equipment and techniques described in Example 1 the preparation is repeated using 180 parts by weight of isopropanol saturated with hydrogen chloride as the solvent-catalyst mixture, and 10 parts by weight of the diammonodecaborane as reactant. Again a substantially quantitative yield of product is obtained and the structure of the product is established as before.

*Example 3.—Preparation of ammonononaborane using diverse catalysts*

Using the same procedures and equipment described in Examples 1 and 2 in detail, further preparations of product are run using 10 parts by weight of the diammonodecaborane reactant, and 170 parts by weight of ethanol and the anhydrous catalysts listed below:

Catalyst: $AlCl_3$; $FeCl_3$; $SnCl_4$; $BCl_3$.

We claim:
1. A process for preparing $B_9H_{13}NH_3$ comprising contacting $(NH_3)_2B_{10}H_{12}$ and an aliphatic alcohol containing up to three carbon atoms in the presence of an acid catalyst selected from the group consisting of boron trifluoride, boron trichloride, hydrogen chloride, hydrogen fluoride, hydrogen bromide, aluminum chloride, ferric chloride and stannic chloride until the evolution of hydrogen has substantially ceased, and isolating the product contained therein.
2. The process of claim 1 wherein the acid catalyst is boron trifluoride and the alcohol is ethanol.
3. The process of claim 1 wherein the acid catalyst is boron trichloride and the alcohol is ethanol.
4. The process of claim 1 wherein the acid catalyst is boron trifluoride and the alcohol is isopropanol.
5. The process of claim 1 wherein the acid catalyst is boron trichloride and the alcohol is isopropanol.
6. The process of claim 1 wherein the acid catalyst is hydrogen chloride and the alcohol is ethanol.

References Cited
UNITED STATES PATENTS

| | | | |
|---|---|---|---|
| 3,148,938 | 9/1964 | Knoth | 23—14 |
| 3,149,010 | 9/1964 | Armstrong | 149—22 |
| 3,153,567 | 10/1964 | Fetter | 23—14 |
| 3,169,045 | 2/1965 | Miller et al. | 23—14 |

OTHER REFERENCES

Graybill et al.: "Inorganic Chemistry," vol. 1, pp. 626–631, August 1962.

Nawthorne et al.: "American Chemical Society, Abstracts of Papers, 138th Meeting, 1960," pp. 45N, 46N.

MILTON WEISSMAN, *Primary Examiner.*

BENJAMIN R. PADGETT, *Examiner.*

L. A. SEBASTIAN, *Assistant Examiner.*